United States Patent Office 2,969,353
Patented Jan. 24, 1961

2,969,353
PROCESS FOR THE PREPARATION OF "ACTIVE METHIONINE" AND PRODUCTS OBTAINED THEREBY

Clifford H. Shunk, Westfield, N.J., and John W. Richter, Wilmington, Del., assignors to Merck & Co., Inc., Rahway, N.J., a corporation of New Jersey No Drawing. Filed Feb. 6, 1957, Ser. No. 638,460

9 Claims. (Cl. 260—211.5)

The present invention relates to an improved process for the preparation of "active methionine" and to novel chemical products obtained thereby.

"Active methionine" is a substance which has been prepared enzymatically by Cantoni, J. Am. Chem. Soc., 74, 2942 (1952); J. Biol. Chem., 189, 203 (1951); ibid., 189, 745 (1951); and ibid., 204, 407 (1953). It has also been prepared chemically by Baddiley and Jamieson, J. Chem. Soc., April 1955, p. 1085.

The structural formula of "active methionine," also sometimes referred to as S-adenosyl-methionine, and in the form of a salt of a strong acid, can be represented as follows:

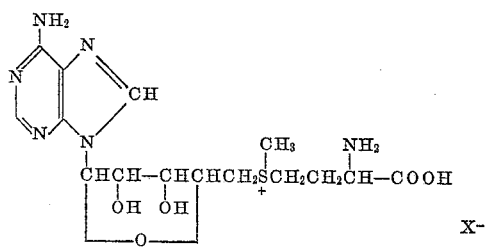

where X is a halogen.

"Active methionine" is of interest because of the mobility of the methyl group attached to the positively charged S atom and because of its potential use as a lipotropic agent, i.e., in the treatment of various liver diseases.

While methods for preparing "active methionine" are known, as aforesaid, these methods leave much to be desired. The enzymatic method is merely of academic interest, the yield—and hence the cost of the product—being such as to render that method of no interest as a source of substantial quantities of the product. Nor does the known chemical process materially improve the situation, as it is quite cumbersome, the yields are low, and the product is an amorphous, unstable racemic mixture having only about one half the potency of the natural product in its ability to undergo transmethylation reactions. Moreover, the known chemical method involves purifying the reineckate of "active methionine," which is undesirable because of the formation of toxic cyanate and cyanide ions on decomposition of the reineckate.

It is an object of this invention to provide a technically-simple and commercially feasible process for preparing "active methionine" in good yields.

A further object of our present invention is to provide "active methionine" substantially in the form of the optically active isomer as obtained enzymatically.

Other objects will become apparent from the following description.

We have attained the foregoing and other objects in accordance with the present invention by contacting the reaction product of adenosyl homocysteine and methyl halide with a suitable cation exchange substance and eluting "active methionine" halide from the cation exchange substance.

The reaction of adenosyl homocysteine and methyl iodide has already been suggested. However, the "active methionine" thereby obtained was obtained in the form of a racemic mixture, and was purified as the reineckate salt, as aforesaid. Regeneration from the reineckate by means of silver sulfate presumably gave the "active methionine" in a low yield, the product not being characterized adequately.

The reaction of adenosyl homocysteine and methyl iodide may be conducted in known manner. We prefer to employ adenosyl-L-homocysteine and methyl iodide although the racemic adenosyl homocysteine and other methyl halides, such as methyl chloride, may be used, if desired.

The cation exchange substances which may be used in accordance with our invention are numerous. Any high molecular weight substance, insoluble in water, and containing a weakly acid, negatively charged group, such as a carboxyl, bound thereto, with a mobile positively charged ion, can be employed. The cation exchange substance should be on the ammonium or sodium cycle, as distinguished from the hydrogen cycle. The recitation of the ammonium cycle in the claims is understood to include the sodium cycle wherever the context admits or requires.

The particular nature of the base material from which the cation exchange resin is prepared is not critical. Thus, a cation exchange resin prepared from a phenol and an aldehyde or from styrene-divinylbenzene copolymers, may be used and the polar group may be introduced prior or subsequent to resin formation. The polar groups may be phenolic or carboxylic or other weakly acid groups.

Among the specific cation exchange resins containing weakly acidic, negatively charged, high molecular weight portions which have been used on the ammonium cycle, in accordance with the present invention, are the ones tabulated below:

| Name | Manufacturer | Total Capacity | |
|---|---|---|---|
| | | Me.¹/g. | Me.¹/ml. |
| Amberlite IRC-50 | Rohm & Haas, Philadelphia, Pa. | 10.0 | 4.2 |
| Alkalex | Research Products | 4.95 | 1.80 |
| Duolite CS-100 | Chemical Process, Redwood City, Calif. | 3.85 | 1.11 |
| Wofatit C | I. G. Farben | 7.00 | 2.50 |
| Permutit 1-170 | Permutit, New York, N.Y. | 5.30 | 1.70 |

¹ Milliequivalents.

The "active methionine" salt undergoes salt formation with the cation exchange resins employed. The adenosylhomocysteine and other undesired products from the methylation are not taken up by the resin.

As eluants, to remove the "active methionine" salt from the cation exchange substance, we may employ aqueous solutions of any strong acid, such as hydrochloric acid, sulfuric acid, perchloric acid, or phosphoric acid.

With respect to the cation exchange substances and eluants used in accordance with this invention we follow conventional practice as regards the procedures and techniques employed.

The following examples are given by way of illustration and not by way of limitation. The degrees are given on the centigrade scale.

EXAMPLE I

*(a) Preparation of 2',3'-isopropylidene-5'-p-toluenesulfonyl adenosine*

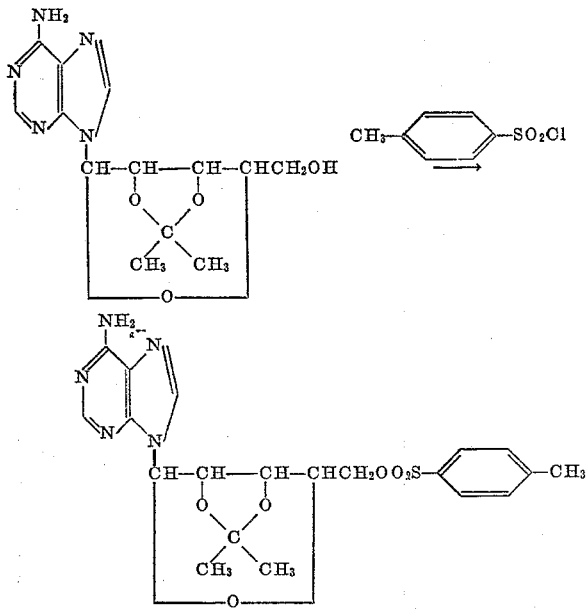

Anhydrous 2',3'-isopropylidene adenosine (11.7 g.) was dissolved in 125 ml. of anhydrous pyridine with slight warming and then the solution was cooled in an ice bath. To this solution, 8.0 g. of p-toluenesulfonyl chloride was added with shaking. This mixture was kept at room temperature (25° C.) for ten hours. Fifty ml. of water followed by 500 ml. of an ice-cold, saturated solution of sodium bicarbonate was added to the reaction mixture. The cloudy mixture was extracted three times with 500 ml. portions of cold chloroform. The combined chloroform extracts were washed twice with one l. portions of an ice-cold, saturated solution of sodium bisulfate and then twice with one l. portions of cold water. The yellow, chloroform solution was dried rapidly by shaking with anhydrous magnesium sulfate, filtered, and then concentrated under reduced pressure to a volume of 200 ml. Petroleum solvent (B.P. 85.5°–100°) (Skellysolve C) was added slowly to the concentrated, chloroform solution and the mixture was cooled and scratched to start crystallization. After 400 ml. of the petroleum solvent had been added, the mixture was kept in the ice-box overnight. The colorless needles were collected on a filter and washed with petroleum ether (B.P. 30°–60°); weight 11 g. (63%). They underwent a change in crystalline structure at about 120° C. and then melted with decomposition at 290°–295° C. on a Köfler micro hot stage. Some of the colorless product was dried at 78° C. under 0.1 mm. of mercury pressure for four hours and some was dried under the same vacuum at 110° C. for one hour. Material dried at 78° C./0.1 mm. for four hours gave a strong Beilstein test for halogen and showed an analysis indicative of chloroform of crystallization.

*Analysis.*—Calculated for $C_{20}H_{23}N_5O_6S$: C, 52.05; H, 5.02; N, 15.18; S, 6.95. Found: C, 47.04; H, 4.20; N, 13.08. Found in material dried at 110° C. for one hour: C, 52.22; H, 5.42; N, 14.43; S, 7.13. (Negative Beilstein test.)

*(b) Preparation of di-sodium salt of L-homocysteine*

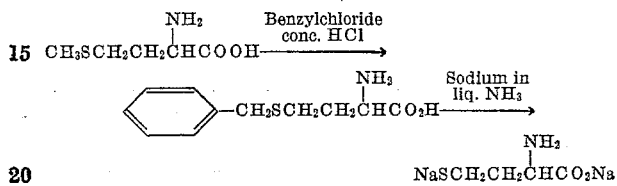

S-benzyl-L-homocysteine was prepared by the method of Dekker and Fruton, J. Biol. Chem., 173, 475 (1948). The product from 50 g. of L-methionine was recrystallized from six l. of boiling water in a 31% yield; M.P. 230–4° dec. $[\alpha]_D$ +26 (c. 1.0 in 1.0 N hydrochloric acid).

S-benzyl-L-homocysteine (5.9 g.) was dissolved in 200 ml. of anhydrous liquid ammonia and sodium was added in small pieces with stirring until a permanent blue color was obtained (about 1.20 g. of sodium was required). The solution was then decolorized by the addition of a small amount of S-benzyl-L-homocysteine.

*(c) Preparation of S-adenosyl-L-homocysteine*

To the decolorized solution obtained in accordance with the present example (b) was added 10 g. of 2', 3'-isopropylidene-5'-p-toluenesulfonyl adenosine, made in accordance with part (a) of this example. The solution was stirred until the ammonia had evaporated (about three hours). Nitrogen was then passed over the resulting powder for one hour. After cooling in an ice bath, 56 ml. of cold 2 N sulfuric acid was added, giving a cloudy solution that was 1 N with respect to sulfuric acid. The solution was kept at 25° C. for twenty-four hours and then stored at 4° C. overnight. The solution was diluted with an equal volume of water and extracted with two 50 ml. portions of ether. The aqueous layer, after removing the dissolved ether under reduced pressure, was passed through a column containing 500 ml. of Amberlite IRA–400 resin that was on the hydroxide ion cycle. After washing with water, S-adenosyl-L-homocysteine was eluted with 1 N acetic acid. The eluate having a density greater than 0.20 at 260 mu on the Beckmann quartz spectrophotometer when diluted 1 to 100 was lyophilized. The resulting material was dissolved in 90 ml. of water, filtered and cooled overnight at 4° C. The precipitate was collected and dried in vacuo over phosphorus anhydride, wt. 5.60 g., M.P. 210°–216° C. A second crop was obtained from the filtrate by absorption on IRA–400 resin, elution, lyophilization and crystallization as above, wt. 0.76 g., M.P. 208°–213° C. A sample for analysis was recrystallized twice from water, M.P. 209°–211° C., and dried at 78° C. in vacuo;

$\lambda_{max.}^{H_2O}$ 260 mu, E% 418

$[\alpha]_D^{25°C.}$ +37 (c.1.3 in 0.1 N sulfuric acid). Drying the sample at 117° C. (1 mm.) resulted in a further loss of 3.3%.

*Analysis.*—Calculated for $C_{14}H_{20}N_6O_5S$: C, 43.7; H, 5.2; N, 21.9; S, 8.3. Found: C, 43.2; H, 5.5; N, 21.8; S, 8.6.

This procedure may be represented by the following reactions:

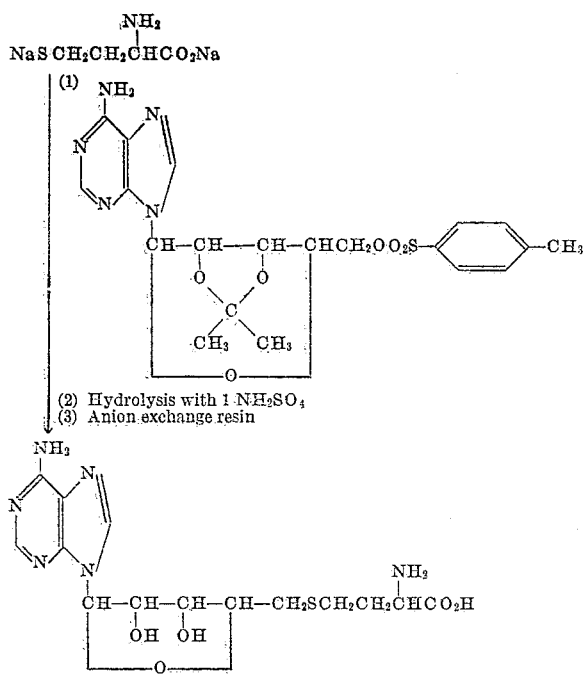

(2) Hydrolysis with 1 N H₂SO₄
(3) Anion exchange resin

The picrate of S-adenosyl-L-homocysteine was prepared by adding aqueous picric acid to an aqueous solution of S-adenosyl-L-homocysteine. The salt was recrystallized from water; M.P. 175°–177° C.

*Analysis.*—Calculated for $C_{20}H_{23}N_9O_{12}S \cdot H_2O$: C, 38.0; H, 4.0; N, 20.0. Found: C, 38.8; H, 4.3; N, 19.3.

*(d) Preparation of "active methionine" chloride*

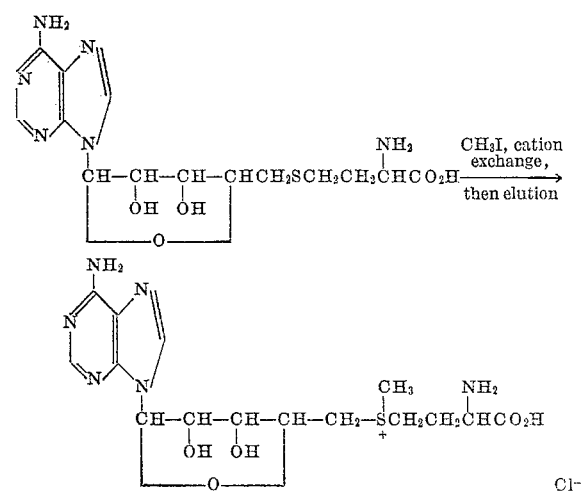

A solution of 1.8 g. of adenosyl-L-homocysteine as prepared in part (c) of this example, 18 ml. of glacial acetic acid, 18 ml. of formic acid (88%) and 9 ml. of methyl iodide was kept at room temperature in the dark for six days. After concentration under reduced pressure to a volume of about 20 ml. at a temperature under 25° C., the reaction mixture was diluted with 100 ml. of water and freeze-dried in the dark. During this time, a column (2.0 cm. diam.) containing 160 ml. of Amberlite IRC–50 resin on the ammonium ion cycle was thoroughly washed with water to remove any excess ammonium hydroxide. All of the water used in the preparation of the column and of the aqueous eluants had been previously passed through a column of Amberlite IRC–50 (H⁺) resin to remove copper ions from the distilled water. The freeze-dried material was dissolved in 50 ml. of ice-cold water and filtered to remove a small amount of insoluble tar. The yellow filtrate was passed through the column of IRC–50 resin (NH₄⁺ cycle) at a rate of 60 ml./hour. The column was washed with 100 ml. of cold water at this rate and then washed rapidly with 200 ml. of cold water. The column was eluted with 600 ml. of ice-cold 1 N acetic acid at a rate of 200 ml./hour. Elution with acetic acid was continued until the pH of the eluate fell below 3.0, at which point only a negligible concentration of ammonium ions remained on the column. Finally, the column was eluted with two 200-ml. portions of ice-cold 0.1 N hydrochloric acid at a rate of 100 ml. per hour. The hydrochloric acid eluates were lyophilized and the residues were dissolved in 30 ml. of methanol by acidification with a few drops of 3.0 N hydrochloric acid. This solution was stirred rapidly and cooled in an ice bath, while the pH was brought to 6.0 by dropwise addition of 6.0 N ammonium hydroxide. The colorless precipitate was collected on a filter and washed with cold methanol, acetone, and ether in that order; weight 950 mg. (45%); M.P. 118–122 dec. with effervescence. A sample for analysis was recrystallized twice from methanol by the method described above, then dissolved in a minimum quantity of 80% methanol and treated with an equal volume of absolute ethanol. After cooling this mixture overnight at 0° C., the colorless crystals were collected on a filter and dried at 25° C. in vacuo over phosphoric anhydride;

$$\lambda^{H_2O}_{max.} \ 260 \ m\mu$$

$E\% = 310 \ [\alpha]_D^{25} + 32$ (c. 3.3 in water). This sample was too hygroscopic to weigh directly for analysis and had to be pigged to constant weight at 25° C. in vacuo.

*Analysis.*—Calculated for $C_{15}H_{23}N_6O_5SCl$: C, 41.42; H, 5.33; N, 19.33; Cl, 8.13. Calculated for $$C_{15}H_{23}N_6O_5SCl \cdot H_2O$$

C, 39.79; H, 5.56; N, 18.56; Cl, 7.83. Found: C, 40.04; H, 5.34; N, 17.92; Cl, 7.95.

Paper chromatography (J. Baddiley and G. A. Jamieson, Chem. and Eng., (1954), 375) (Whatman No. 1) using an n-butanol, acetic acid, water system (4:1:5) indicated that the "active methionine" chloride was homogeneous; for a single spot ($R_f$ 0.06) was observed by fluorescence in ultra-violet light and by spraying with ninhydrin. "Active methionine" chloride, a novel substance, appeared to be stable on storage at 0° C. in a vacuum desiccator when examined by paper strips. The $R_f$ values for adenosyl-L-homocysteine and 2′,3′-isopropylidene-adenosyl-L-homocysteine in this system were 0.13 and 0.30 respectively.

The transference enzymatically of the methyl group from "active methionine" to nicotinamide was measured by modifying the method of Cantoni (G. L. Cantoni, J. Biol. Chem. 189, 745 (1951); ibid., 204, 403 (1953)). "Active methionine," prepared enzymatically, was purified by paper chromatography to provide a reference standard. A solution containing 200 μg. of "active methionine" (enzymatically produced) was placed as a narrow band across a strip of Whatman No. 1 paper four inches in width. Descending chromatography was carried out for eight hours using the system described above. A known area for the "active methionine" band was detected by fluorescence, cut out, and eluted with 5 ml. of water. The aqueous solution was found to contain 45 μg. of "active methionine" per ml. by measuring the U.V. absorption at 260 mμ. Biological assay showed that 53% of the theoretical amount of N-methyl-nicotinamide was produced with this preparation. A response of 56% was found for the synthetic "active methionine" chloride.

The chloride salt of "active methionine" was found to be slightly soluble in methanol at pH 6.0 and very soluble at pH 2.0.

(e) Preparation of "active methionine" chloride hydrochloride

The novel mono hydrochloride salt of the "active methionine" chloride was prepared by dissolving the "active methionine" chloride prepared as set forth in part (d) herein in 2 ml. of methanol by acidification with 2.5 N aqueous hydrochloric acid until a solution was obtained. The addition of 6 ml. of absolute ethanol at 0° C. gave a precipitate of the chloridehydrochloride salt, which was found to be stable. This salt was reprecipitated from methanol by the addition of ethanol and dried at 25° C. (1 mm.) over phosphoric anhydride.

*Analysis.*—Calculated for $C_{15}H_{24}N_6O_5SCl_2 \cdot H_2O$: C, 36.82; H, 5.37; Cl, 14.49. Found: C, 36.09; H, 5.78; Cl, 15.6.

This sample showed a response of 40% on biological assay. Paper chromatography in the system described in part (d) indicated that this preparation was homogeneous. A single spot ($R_f$ 0.05) was detectable.

Substantially the same results as in Example I(d) were obtained when the following cation exchange resins were substituted for Amberlite IRC–50:

Alkalex
Duolite CS–110
Permutit H
Wofatit C

Similarly, the use as an eluant of a strong acid such as sulfuric acid, perchloric acid or phosphoric acid, in place of the hydrochloric acid of Example I(d) gave substantially the same results as those noted in Example I(d).

The foregoing illustrates the practice of this invention, which, however, is not to be limited thereby, but is to be construed as broadly as permissible in view of the prior art and limited solely by the appended claims.

We claim:

1. The process for making S-adenosyl-methionine, which comprises contacting the reaction product of adenosyl-homocysteine and a methyl halide with a cation exchange substance on the ammonium cycle and having a weak acid functional group and eluting S-adenosyl-methionine from said substance with a strong acid.

2. The process of claim 1, wherein adenosyl-L-homocysteine is used.

3. The process of claim 2, wherein the methyl halide employed is methyl iodide and the weak acid functional group is a carboxyl.

4. The process of claim 3, wherein a strong mineral acid in aqueous solution is used as the eluant.

5. The process of claim 4, wherein the eluant is an aqueous solution of hydrochloric acid.

6. The process for making S-adenosyl-methionine, which comprises contacting the reaction product of adenosyl-L-homocysteine and methyl iodide with a cation exchange resin having carboxyl groups in the immobile portion and being on the ammonium cycle for a period sufficient to cause the retention of substantially all the desired S-adenosyl-L-methionine by said resin, eluting the resin with aqueous hydrochloric acid, and recovering adenosyl-L-methionine from the eluate.

7. The process for making solid chloride salts of S-adenosyl-methionine which comprises contacting the reaction product of adenosyl-homocysteine and a methyl halide with a cation exchange substance on the ammonium cycle and having a weak acid functional group and eluting S-adenosyl-methionine from said substance with a strong acid, contacting the S-adenosyl-methionine with hydrochloric acid in a liquid medium and separting a solid chloride salt of S-adenosyl-methionine from said medium.

8. The method of claim 7 wherein the solid chloride salt is S-adenosyl-L-methionine chloride.

9. The method of claim 7 wherein the solid chloride salt is the hydrochloride of S-adenosyl-L-methionine chloride.

References Cited in the file of this patent

UNITED STATES PATENTS

| | | |
|---|---|---|
| 2,387,824 | Block | Oct. 30, 1945 |
| 2,700,038 | Lipton et al. | Jan. 18, 1955 |

OTHER REFERENCES

Cantoni: "J. Biol. Chem.," vol. 204, September-October 1953, pages 403 to 407. QP 501 J7.

Baddiley et al.: "J. Chem. Soc.," April 1955, pages 1085 to 1089.